US012202488B2

(12) United States Patent
Zhou et al.

(10) Patent No.: US 12,202,488 B2
(45) Date of Patent: Jan. 21, 2025

(54) METHOD AND DEVICE FOR GRADIENT CALCULATING

(71) Applicant: Great Wall Motor Company Limited, Hebei (CN)

(72) Inventors: Dexiang Zhou, Hebei (CN); Yuling Liu, Hebei (CN); Jian Zhang, Hebei (CN); Xu Shi, Hebei (CN)

(73) Assignee: Great Wall Motor Company Limited, Hebei (CN)

( * ) Notice: Subject to any disclaimer, the term of this patent is extended or adjusted under 35 U.S.C. 154(b) by 279 days.

(21) Appl. No.: 17/640,678

(22) PCT Filed: Oct. 14, 2020

(86) PCT No.: PCT/CN2020/120778
§ 371 (c)(1),
(2) Date: Mar. 4, 2022

(87) PCT Pub. No.: WO2021/078043
PCT Pub. Date: Apr. 29, 2021

(65) Prior Publication Data
US 2022/0324455 A1 Oct. 13, 2022

(30) Foreign Application Priority Data
Oct. 23, 2019 (CN) .......................... 201911013846.8

(51) Int. Cl.
*B60W 40/076* (2012.01)
*B60W 40/105* (2012.01)
*B60W 50/00* (2006.01)

(52) U.S. Cl.
CPC ........ *B60W 40/076* (2013.01); *B60W 40/105* (2013.01); *B60W 50/0098* (2013.01);
(Continued)

(58) Field of Classification Search
CPC .................... B60W 40/076; B60W 2552/15
See application file for complete search history.

(56) References Cited

U.S. PATENT DOCUMENTS 4,779,202 A * 10/1988 Leiber .................... B60T 8/175
701/84
2009/0265058 A1 10/2009 Hasegawa et al.
(Continued)

FOREIGN PATENT DOCUMENTS

CN 102700551 A 10/2012
CN 103661393 A 3/2014
(Continued)

OTHER PUBLICATIONS

International Search Report for Application No. PCT/CN2020/118443 mailed on Apr. 26, 2021.

*Primary Examiner* — Imran K Mustafa
(74) *Attorney, Agent, or Firm* — Renner, Otto, Boisselle & Sklar, LLP

(57) ABSTRACT

The present application relates to the technical field of vehicle controlling technology, and provides a method and a device for gradient calculating. The method for gradient calculating includes: acquiring current operating parameters of the vehicle, wherein the current operating parameters include a current longitudinal acceleration, a current lateral acceleration, a current vehicle acceleration, and a current vehicle speed; determining a first influence value of the current lateral acceleration on the current longitudinal acceleration according to the current lateral acceleration and the current vehicle speed; determining a second influence value of the current vehicle acceleration on the current longitudinal acceleration according to the current vehicle acceleration and the current vehicle speed; correcting the current longitudinal acceleration according to the first influence value and
(Continued)

the second influence value; and determining the gradient value based on the corrected current longitudinal acceleration.

20 Claims, 2 Drawing Sheets

(52) U.S. Cl.
CPC .............. *B60W 2050/0056* (2013.01); *B60W 2520/105* (2013.01); *B60W 2520/125* (2013.01); *B60W 2552/15* (2020.02)

(56) References Cited

U.S. PATENT DOCUMENTS

| | | | |
|---|---|---|---|
| 2015/0274174 A1* | 10/2015 | Tao | B60W 30/188 |
| | | | 701/1 |
| 2018/0273045 A1* | 9/2018 | Herrera | B60W 40/11 |
| 2019/0176811 A1* | 6/2019 | Cho | B60G 17/0165 |
| 2022/0017071 A1* | 1/2022 | Mei | B60W 30/18145 |

FOREIGN PATENT DOCUMENTS

| | | | |
|---|---|---|---|
| CN | 103786730 A | | 5/2014 |
| CN | 106515739 A | | 3/2017 |
| CN | 108189842 A | | 6/2018 |
| CN | 108297872 A | | 7/2018 |
| CN | 109466559 A | | 3/2019 |
| CN | 110103976 A | | 8/2019 |
| CN | 110155059 A | | 8/2019 |
| CN | 110239554 A | | 9/2019 |
| DE | 102017206717 A | | 10/2018 |
| JP | 2002162225 A | | 6/2002 |
| WO | 2019189322 A | | 10/2019 |

\* cited by examiner

METHOD AND DEVICE FOR GRADIENT CALCULATING

CROSS REFERENCE TO RELATED APPLICATION

The present application is a National phase of international patent application No. PCT/CN2020/120778 with an international filling date of Oct. 14, 2020, designating the USA, now, and further claims priority of Chinese Patent Application No. 201911013846.8, with filling date of Oct. 23, 2019, the contents of all of the aforementioned application, including any intervening amendments thereto, which is are incorporated herein by reference.

TECHNICAL FIELD

The present application relates to the technical field of vehicle controlling technology, and more particularly to a method and a device for gradient calculating.

BACKGROUND

At present, the competition in the automobile industry is fierce, and it is more competitive only when it is improved in comfort, power and other aspects. Therefore, vehicles need to meet the requirements of various road conditions as much as possible. Among them, for slope road conditions, the gradient value has been increasingly used as a dynamic index of whether the vehicle fully adapts to the slope road conditions. However, in the prior art, the rate of change of the longitudinal angular velocity is first measured by an angular velocity sensor, and then the gradient value is acquired by integrating processing the rate of change of the longitudinal angular velocity. However, this solution only considers the influence caused by the change of the longitudinal angular velocity, which is inaccurate for the dynamic gradient calculation, and at the same time requires an additional angular velocity sensor, which is costly.

SUMMARY

In view of this, the present application aims to provide a method for gradient calculating, in order to at least solve above technical problems.

In order to achieve above object, the technical solution of the present application is realized as follows:

A method for gradient calculating, which includes: acquiring current operating parameters of the vehicle, wherein the current operating parameters include a current longitudinal acceleration, a current lateral acceleration, a current vehicle acceleration, and a current vehicle speed; determining a first influence value of the current lateral acceleration on the current longitudinal acceleration according to the current lateral acceleration and the current vehicle speed; determining a second influence value of the current vehicle acceleration on the current longitudinal acceleration according to the current vehicle acceleration and the current vehicle speed; correcting the current longitudinal acceleration according to the first influence value and the second influence value; and determining the gradient value based on the corrected current longitudinal acceleration.

Further, the step of acquiring current operating parameters of the vehicle includes: acquiring the current longitudinal acceleration and the current lateral acceleration respectively collected by a lateral acceleration sensor and a longitudinal acceleration sensor of the vehicle, and performing filtering processing on the current longitudinal acceleration and the current lateral acceleration.

Further, the step of determining a first influence value of the current lateral acceleration on the current longitudinal acceleration according to the current lateral acceleration and the current vehicle speed includes: querying a first influence value table preconfigured to match the first influence value corresponding to the current lateral acceleration and the current vehicle speed, wherein the first influence value table is configured to show a corresponding relationship between a vehicle speed and a lateral acceleration of the vehicle and the first influence value.

Further, before querying a first influence value table preconfigured, the method for gradient calculating further includes: acquiring a plurality of lateral acceleration values correspondingly generated when the vehicle operates in a plurality of steering conditions under a same vehicle speed and a same accelerator pedal opening, wherein the plurality of steering conditions comprise a no-steering condition; calculating a difference of each lateral acceleration value corresponding to the longitudinal acceleration value in the no-steering condition as the first influence value; and configuring the first influence value table based on the calculated first influence value.

Further, the step of determining a second influence value of the current vehicle acceleration on the current longitudinal acceleration according to the current vehicle acceleration and the current vehicle speed includes: querying a second influence value table preconfigured to match the second influence value corresponding to the current vehicle acceleration and the current vehicle speed, wherein the second influence value table is configured to show corresponding relationship between a vehicle speed and a vehicle acceleration of the vehicle and the second influence value.

Further, before querying a second influence value table preconfigured, the method for gradient calculating further includes: acquiring a plurality of vehicle acceleration values and longitudinal acceleration values corresponding to multiple acceleration and deceleration conditions when the vehicle is running in a straight line; calculating difference between each longitudinal acceleration value and the corresponding vehicle acceleration value as the second influence value; and configuring the second influence value table based on the calculated second influence value.

Further, the step of correcting the current longitudinal acceleration according to the first influence value and the second influence value includes: subtracting the first influence value and the second influence value from the current longitudinal acceleration to acquire the corrected current longitudinal acceleration.

Further, the step of determining the gradient value based on the corrected current longitudinal acceleration includes: acquiring a difference between the corrected current longitudinal acceleration and the current vehicle acceleration, and dividing the difference by a gravitational acceleration to acquire an intermediate calculated value; performing an arcsine function calculation on the intermediate calculated value to obtain a slope degree; and performing a tangent function calculation on the slope degree to obtain the slope value.

Compared to the prior art, the method for gradient calculating of the present application has the following advantages:

The method for gradient calculating of embodiments of the present application does not require a gradient sensor or an angular velocity sensor, preforming fine turning to the longitudinal acceleration through the lateral acceleration and the vehicle speed, and preforming fine turning to the longitudinal acceleration through the vehicle acceleration and the vehicle speed, so that the longitudinal acceleration is more accurate. Therefore, the gradient value can be accurately calculated only through the lateral acceleration and the longitudinal acceleration, and the cost of additional sensors is reduced.

A further object of the present application is to provide a device for gradient calculating, in order to at least solve above technical problems.

In order to achieve above object, the technical solution of the present application is realized as follows:

A device for gradient calculating, which includes: an operating parameter acquisition module, configured for acquiring current operating parameters of the vehicle, wherein the current operating parameters include a current longitudinal acceleration, a current lateral acceleration, a current vehicle acceleration, and a current vehicle speed; a first influence value determination module, configured for determining a first influence value of the current lateral acceleration on the current longitudinal acceleration according to the current lateral acceleration and the current vehicle speed; a second influence value determination module, configured for determining a second influence value of the current vehicle acceleration on the current longitudinal acceleration according to the current vehicle acceleration and the current vehicle speed; a longitudinal acceleration correction module, configured for correcting the current longitudinal acceleration according to the first influence value and the second influence value; and a gradient value determination module, configured for determining the gradient value based on the corrected current longitudinal acceleration.

Further, the operating parameter acquisition module includes: an acquisition sub-module, configured for acquiring the current longitudinal acceleration and the current lateral acceleration respectively collected by a lateral acceleration sensor and a longitudinal acceleration sensor of the vehicle; and a processing sub-module, configured for performing filtering processing on the current longitudinal acceleration and the current lateral acceleration.

Further, the first influence value determination module comprises: a first query sub-module, configured for querying a first influence value table preconfigured to match the first influence value corresponding to the current lateral acceleration and the current vehicle speed, wherein the first influence value table is configured to show a corresponding relationship between a vehicle speed and a lateral acceleration of the vehicle and the first influence value; and a first table building sub-module, configured for acquiring a plurality of lateral acceleration values correspondingly generated when the vehicle operates in a plurality of steering conditions under a same vehicle speed and a same accelerator pedal opening, calculating a difference of each lateral acceleration value corresponding to the longitudinal acceleration value in the no-steering condition as the first influence value, and configuring the first influence value table based on the calculated first influence value.

Further, the second influence value determination module comprises: a second query sub-module, configured for querying a second influence value table preconfigured to match the second influence value corresponding to the current vehicle acceleration and the current vehicle speed, wherein the second influence value table is configured to show corresponding relationship between a vehicle speed and a vehicle acceleration of the vehicle and the second influence value; and a second table building sub-module, configured for acquiring a plurality of vehicle acceleration values and longitudinal acceleration values corresponding to multiple acceleration and deceleration conditions when the vehicle is running in a straight line, calculating difference between each longitudinal acceleration value and the corresponding vehicle acceleration value as the second influence value, and configuring the second influence value table based on the calculated second influence value.

Further, the longitudinal acceleration correction module, configured for correcting the current longitudinal acceleration according to the first influence value and the second influence value, and includes: subtracting the first influence value and the second influence value from the current longitudinal acceleration to acquire the corrected current longitudinal acceleration.

Further, the gradient value determination module, configured for determining the gradient value based on the corrected current longitudinal acceleration, and includes: acquiring a difference between the corrected current longitudinal acceleration and the current vehicle acceleration, and dividing the difference by a gravitational acceleration to acquire an intermediate calculated value; performing an arcsine function calculation on the intermediate calculated value to obtain a slope degree; and performing a tangent function calculation on the slope degree to obtain the slope value.

A further object of the present application is to provide a machine-readable storage medium or a processor, in order to at least solve above technical problems.

In order to achieve above object, the technical solution of the present application is realized as follows:

A machine-readable storage medium on which instructions are stored, wherein the instructions are configured for causing the method for gradient calculating above-mentioned executed by a machine.

A processor for running a program, wherein when the program is running, and the method for gradient calculating above-mentioned is executed.

The device for gradient calculating and the machine-readable storage medium have the same advantages as that of the method for gradient calculating relative to the prior art, which will not be repeated herein.

Other features and advantages of the present application will be described in detail in the detailed description that follows.

BRIEF DESCRIPTION OF THE DRAWINGS

The accompanying drawings constituting a part of the present application are used to provide further understanding of the present application, and the schematic embodiments of the present application and their descriptions are used to explain the present application and do not constitute an improper limitation of the present application. In the drawings.

DESCRIPTION OF REFERENCE NUMBERS

100, operation parameter acquisition module; 200, first influence value determination module; 300, second influence value determination module; 400, longitudinal acceleration correction module; 500, gradient value determination module.

DETAILED DESCRIPTION

It should be noted that the embodiments of the present application and the features of the embodiments may be combined with each other without conflict.

The present application will be described in detail below with reference to the accompanying drawings and in conjunction with the embodiments.

Figure 1:
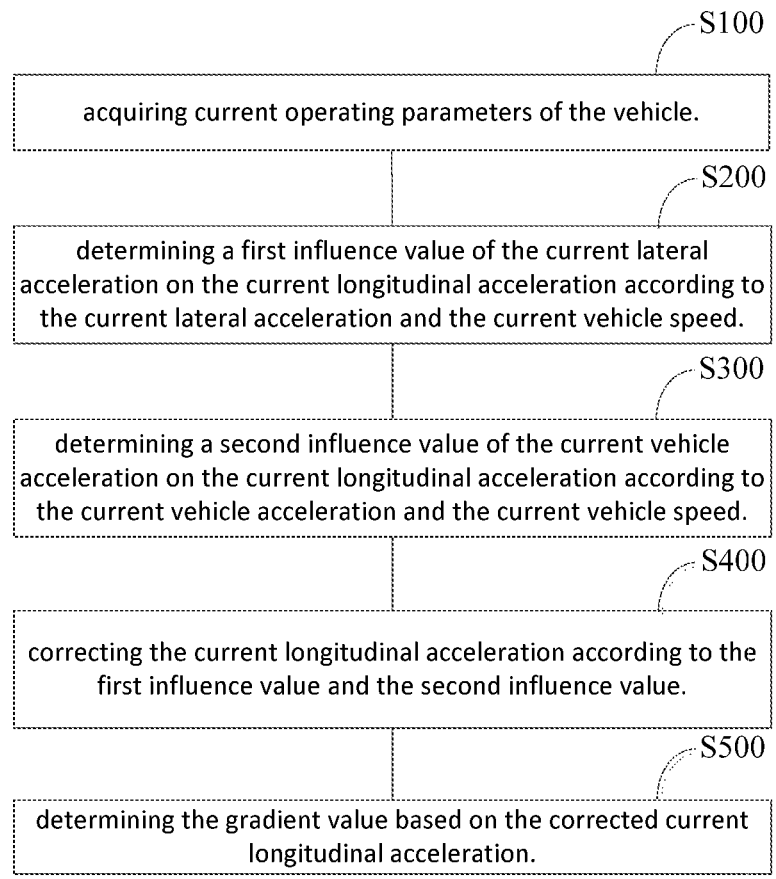
FIG. 1 is a schematic flowchart of a method for gradient calculating according to an embodiment of the present application.

FIG. 1 is a schematic flowchart of the method for gradient calculating according to an embodiment of the present application. As shown in FIG. 1, the method for gradient calculating may include the following steps:

Step S100: acquiring current operating parameters of the vehicle, wherein the current operating parameters include a current longitudinal acceleration, a current lateral acceleration, a current vehicle acceleration, and a current vehicle speed.

Among them, the current longitudinal acceleration and the current lateral acceleration may be collected by the lateral acceleration sensor and the longitudinal acceleration sensor of the vehicle, respectively. At present, many vehicles are equipped with Electronic Stability Program (ESP), and vehicles equipped with ESP are equipped with lateral acceleration sensors and longitudinal acceleration sensors. Therefore, the embodiment of the present application does not need to configure additional related sensors, which is beneficial to saving costs.

In a preferred embodiment, in order to prevent the final calculated gradient value from fluctuating and jumping due to the signal fluctuation of the longitudinal acceleration and the lateral acceleration, the current longitudinal acceleration and the current lateral acceleration respectively collected by the lateral acceleration sensor and the longitudinal acceleration sensor can be performed filtering processing for subsequent calculations. Among them, the filtering process is, for example, low-pass filtering performed by using a low-pass filter.

In addition, in the embodiments of the present application, the vehicle speed can be acquired in various ways, for example, the vehicle speed can be acquired from the vehicle speed meter through the vehicle CAN bus. After the vehicle speed is acquired, the vehicle acceleration can be determined according to the change of the vehicle speed at the current moment relative to the vehicle speed at the previous moment. For example, v is the vehicle speed, v1 is the current vehicle speed, v0 is the previous vehicle speed, t is the time interval, and a is the vehicle acceleration, then $a=(v1-v0)/t$.

Step S200: determining a first influence value of the current lateral acceleration on the current longitudinal acceleration according to the current lateral acceleration and the current vehicle speed.

Corresponding to step S200 and the following step S300, it should be noted that the embodiment of the present application uses longitudinal acceleration to calculate the gradient value, and considers two influencing factors of longitudinal acceleration (vehicle lateral acceleration and vehicle acceleration). Among them, the influence of vehicle lateral acceleration on longitudinal acceleration is manifested as the lateral deviation of the vehicle, the influence of vehicle acceleration on longitudinal acceleration is manifested as the longitudinal inclination of the vehicle, and the longitudinal inclination is also manifested as the influence of the tilted depression angle of the vehicle and so on. In addition, the lateral deviation of the vehicle and the longitudinal inclination of the vehicle substantially reflect the running posture of the vehicle, so the calculation of the gradient value in the embodiments of the present application takes the running posture of the vehicle into consideration, which belongs to the dynamic calculation of the gradient value.

In a preferred embodiment, for the step S200, the first influence value can be determined by looking up a table, which specifically includes: querying a first influence value table preconfigured to match the first influence value corresponding to the current lateral acceleration and the current vehicle speed.

The first influence value table is configured to show a corresponding relationship between a vehicle speed and a lateral acceleration of the vehicle and the first influence value. For example, the first influence value represents the corresponding first influence value being y1 when the vehicle speed is v1 and the lateral acceleration is a1.

In a more preferred embodiment, the method for gradient calculating of the embodiment of the present application may include the step of configuring the first influence value table, which is specifically as follows:

Step S210: acquiring a plurality of lateral acceleration values correspondingly generated when the vehicle operates in a plurality of steering conditions under a same vehicle speed and a same accelerator pedal opening, wherein the plurality of steering conditions comprise a no-steering condition.

It should be noted that the influence of the lateral acceleration of the vehicle on the longitudinal acceleration is mainly reflected in the steering and sharp steering conditions, so the determination of the lateral acceleration value in the embodiment of the present application is performed based on the steering conditions of the vehicle.

Step S220: calculating a difference of each lateral acceleration value corresponding to the longitudinal acceleration value in the no-steering condition as the first influence value.

Step S230: configuring the first influence value table based on the calculated first influence value.

For steps S210-S230, for example, the accelerator pedal opening k1 of the same depth is depressed at the same vehicle speed v, and five tests are performed for different steering conditions, so that the observed lateral acceleration values are −5, −2, 0, 2, 5 (units omitted) respectively, and then calculate the difference between the four sets of longitudinal acceleration values −5, −2, 2, and 5 and the set of longitudinal acceleration values corresponding to the 0 value to obtain the corresponding first influence value. Finally, based on the calculated first influence value, the first influence value table can be configured as shown in Table 1 below:

TABLE 1

| vehicle speed | lateral acceleration value | the first influence value |
|---|---|---|
| v | −5 | −5 |
| v | −2 | −2 |
| v | 2 | 2 |
| v | 5 | 5 |

The table 1 is only part of the first influence value table. By multiple tests, a more detailed first influence table can be obtained, so as to determine the influence of the longitudinal acceleration of the vehicle lateral acceleration on different speed and lateral acceleration.

Step S300: determining a second influence value of the current vehicle acceleration on the current longitudinal acceleration according to the current vehicle acceleration and the current vehicle speed.

In a preferred embodiment, the second influence value can also be determined by looking up the table, including: querying a second influence value table preconfigured to match the second influence value corresponding to the current vehicle acceleration and the current vehicle speed.

The second influence value table is configured to show corresponding relationship between a vehicle speed and a vehicle acceleration of the vehicle and the second influence value. For example, the second influence value represents the corresponding second influence value being y2 when the vehicle speed is v and the lateral acceleration is a.

In a more preferred embodiment, the method for gradient calculating of the embodiment of the present application can include the step of configuring a second influence value table, as follows:

Step S310: acquiring a plurality of vehicle acceleration values and longitudinal acceleration values corresponding to multiple acceleration and deceleration conditions when the vehicle is running in a straight line.

It should be noted that the second influence value is essentially the acceleration influence value caused by the longitudinal tilt of the vehicle, refers to the influence value of the tilting of the longitudinal posture of the vehicle on the longitudinal acceleration caused by the braking of the acceleration and deceleration of the vehicle. Therefore, the influence of the vehicle acceleration of the vehicle on longitudinal acceleration is mainly reflected in an emergency acceleration, so that the vehicle acceleration value of the present application is determined based on the acceleration and deceleration conditions of the vehicle.

Step S320: calculating difference between each longitudinal acceleration value and the corresponding vehicle acceleration value as the second influence value.

Step S330: configuring the second influence value table based on the calculated second influence value.

For steps S210-S230, for example, the vehicle is traveling straight line, and the six sets of tests including acceleration, deceleration, rapidly acceleration, and rapidly deceleration conditions, six sets of tests correspond to v1-v6, and the vehicle acceleration values of the six sets of tests are −5, −3, −2, 2, 4, 7 (units omitted) respectively, and then observed that the longitudinal acceleration values corresponding to the six sets of tests are a1 (where the longitudinal acceleration value a1 under different speeds can be indicates different values), calculating the difference between the respective longitudinal acceleration value and the corresponding vehicle acceleration value, to obtain the corresponding second influence value. Finally, based on the calculated second influence value, the second influence value table is configured as shown in Table 2 below:

TABLE 2

| Vehicle speed | vehicle acceleration value | longitudinal acceleration value | second influence value (taking the absolute value for calculation) |
|---|---|---|---|
| v1 | −5 | a1 | a1 − 5 |
| v2 | −3 | a1 | a1 − 3 |
| v3 | −2 | a1 | a1 − 2 |
| v4 | 2 | a1 | a1 − 2 |
| v5 | 4 | a1 | a1 − 4 |
| v6 | 7 | a1 | a1 − 7 |

Similarly, the Table 2 is only a part of the second influence value table. By multiple tests, a more detailed second influence table can be obtained to determine the influence of the vehicle acceleration on the longitudinal direction under different vehicle speed and vehicle accelerations.

Step S400: correcting the current longitudinal acceleration according to the first influence value and the second influence value.

Preferably, for the step S400, the first influence value and the second influence value may be subtracted from the current longitudinal acceleration to obtain the corrected current longitudinal acceleration. For example, if the current longitudinal acceleration is a1, and the first and second influence values are y1 and y2, respectively, the corrected current longitudinal acceleration a11 can be calculated by the following formula:

$$a11 = a1 - y1 - y2 \quad (1)$$

Among them, the current longitudinal acceleration a1 is preferably a filtered acceleration value.

Step S500: determining the gradient value based on the corrected current longitudinal acceleration.

Figure 2:
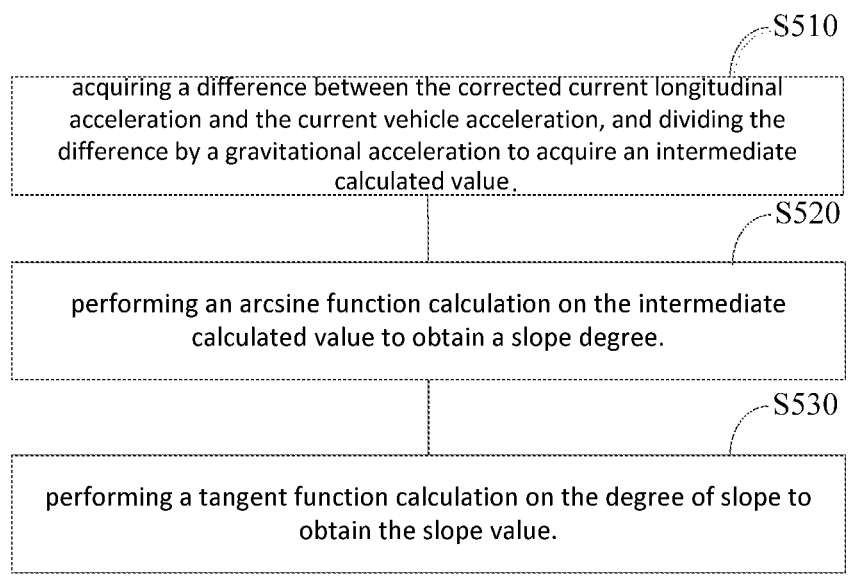
FIG. 2 is a schematic flowchart of determining a gradient value based on a corrected current longitudinal acceleration in an embodiment of the present application.

FIG. 2 is a schematic flowchart of determining a gradient value based on a corrected current longitudinal acceleration in an embodiment of the present application. As shown in FIG. 2, it may specifically include the following steps:

Step S510: acquiring a difference between the corrected current longitudinal acceleration and the current vehicle acceleration, and dividing the difference by a gravitational acceleration to acquire an intermediate calculated value.

For example, if the corrected current longitudinal acceleration is a11, the vehicle acceleration is a, and the gravitational acceleration is g, the intermediate calculated value z can be calculated by the following formula:

$$z = (a11 - a)/g \quad (2)$$

Step S520: performing an arcsine function calculation on the intermediate calculated value to obtain a slope degree.

Continuing the example above, the slope degree θ can be calculated by:

$$\theta = \arcsin[(a11-a)/g] \quad (3)$$

It should be noted that the slope degree θ obtained at this time is a radian system value, so it can be converted into an angle value through angle transformation, that is:

$$\theta = \arcsin[(a11-a12)/g] * 180/\pi \quad (4)$$

Among them, 180/π is used to realize the transformation from numerical value to angle, and the unit of the transformed angle value is degree.

Step S530: performing a tangent function calculation on the degree of slope to obtain the slope value.

Continuing the above example, the gradient value p can be obtained by the following formula:

$$p = \tan(\theta) \quad (5)$$

Further, the unit of the gradient value p can be converted into % through percentage conversion, That is:

$$p = \tan(\theta) * 100\% \quad (6)$$

It should be noted that the gradient value calculated by the embodiment of the present application is a positive value when going upslope and a negative value when going downslope, so it can be applied to different control strategies for torque compensation according to the upslope and downslope.

The calculation of the gradient value using the solution from steps S100 to S500 is described below through a simple example. In the example, after filtering, the longitudinal acceleration a1=2, the lateral acceleration a2=0.1, the vehicle acceleration a=1, the first influence value y1=0.1 caused by the lateral deviation can be obtained by looking up the table, and the second influence value y2=0.1 caused by the longitudinal tilt, further according to the formula (1), the corrected longitudinal acceleration a11=a1−y1−y2=2−0.1−0.1=1.8; according to the formula (3), the slope degree θ=arcsin[(1.8−1)/g]*180/π=4.68°; according to formula (6), the gradient value p=tan(4.68)*100%=8.19%. Through verification, the calculated gradient value is basically consistent with the actual value.

It can be known from the example that the embodiment of the present application can calculate an accurate gradient value based on the longitudinal acceleration and the lateral acceleration.

In summary, the method for gradient calculating of the embodiment of the present application does not require a gradient sensor or an angular velocity sensor, and the longitudinal acceleration is fine-tuned by the lateral acceleration and the vehicle speed, and the longitudinal acceleration is fine-tuned by the vehicle acceleration and the vehicle speed, so that the longitudinal acceleration is more accurate. Therefore, the accurate gradient value can be calculated only by the longitudinal acceleration and the lateral acceleration, which reduces the cost of additionally configuring the sensors. In addition, the gradient value calculated by the embodiment of the present application is dynamic, and the accurate dynamic gradient value is convenient for processing the dynamic strategy that the vehicle is on the slope, thereby facilitating the vehicle to adapt to different roads.

Figure 3:
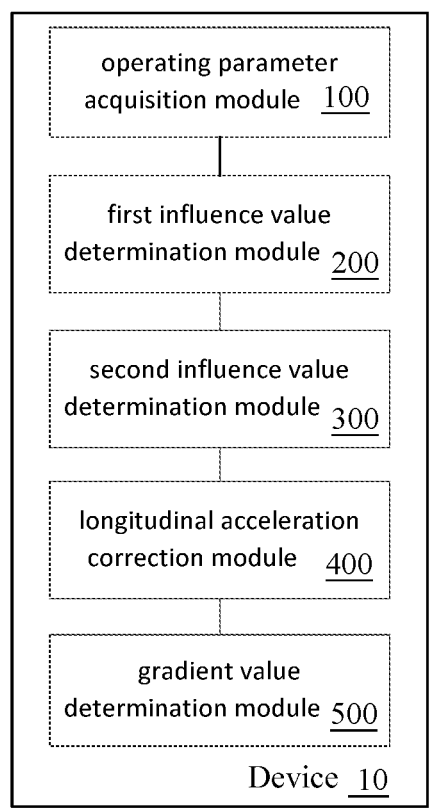
FIG. 3 is a schematic structural diagram of a device for gradient calculating according to another embodiment of the present application.

FIG. 3 is a schematic structural diagram of a device 10 for gradient calculating according to another embodiment of the present application. The device 10 for gradient calculating includes: an operating parameter acquisition module 100, configured for acquiring current operating parameters of the vehicle, wherein the current operating parameters include a current longitudinal acceleration, a current lateral acceleration, a current vehicle acceleration, and a current vehicle speed; a first influence value determination module 200, configured for determining a first influence value of the current lateral acceleration on the current longitudinal acceleration according to the current lateral acceleration and the current vehicle speed; a second influence value determination module 300, configured for determining a second influence value of the current vehicle acceleration on the current longitudinal acceleration according to the current vehicle acceleration and the current vehicle speed; a longitudinal acceleration correction module 400, configured for correcting the current longitudinal acceleration according to the first influence value and the second influence value; and a gradient value determination module 500, configured for determining the gradient value based on the corrected current longitudinal acceleration.

Preferably, the operating parameter acquisition module 100 may include: an acquisition sub-module, configured for acquiring the current longitudinal acceleration and the current lateral acceleration respectively collected by a lateral acceleration sensor and a longitudinal acceleration sensor of the vehicle; and a processing sub-module, configured for performing filtering processing on the current longitudinal acceleration and the current lateral acceleration.

Preferably, the first influence value determination module 200 may include: a first query sub-module, configured for querying a first influence value table preconfigured to match the first influence value corresponding to the current lateral acceleration and the current vehicle speed, wherein the first influence value table is configured to show a corresponding relationship between a vehicle speed and a lateral acceleration of the vehicle and the first influence value.

More preferably, the first influence value determination module 200 may further include: a first table building sub-module, configured for acquiring a plurality of lateral acceleration values correspondingly generated when the vehicle operates in a plurality of steering conditions under a same vehicle speed and a same accelerator pedal opening, and calculating a difference of each lateral acceleration value corresponding to the longitudinal acceleration value in the no-steering condition as the first influence value, and configuring the first influence value table based on the calculated first influence value. Among them, the plurality of steering conditions include a no-steering condition.

Preferably, the second influence value determination module 300 may include: a second query sub-module, configured for querying a second influence value table preconfigured to match the second influence value corresponding to the current vehicle acceleration and the current vehicle speed, wherein the second influence value table is configured to show corresponding relationship between a vehicle speed and a vehicle acceleration of the vehicle and the second influence value.

More preferably, the second influence value determination module 300 may further include: a second table building sub-module, configured for acquiring a plurality of vehicle acceleration values and longitudinal acceleration values corresponding to multiple acceleration and deceleration conditions when the vehicle is running in a straight line, calculating difference between each longitudinal acceleration value and the corresponding vehicle acceleration value as the second influence value, and configuring the second influence value table based on the calculated second influence value.

Preferably, the longitudinal acceleration correction module 400, configured for correcting the current longitudinal acceleration according to the first influence value and the second influence value, and includes: subtracting the first influence value and the second influence value from the current longitudinal acceleration to acquire the corrected current longitudinal acceleration.

Preferably, the gradient value determination module 500, configured for determining the gradient value based on the corrected current longitudinal acceleration, and includes: acquiring a difference between the corrected current longitudinal acceleration and the current vehicle acceleration, and dividing the difference by a gravitational acceleration to acquire an intermediate calculated value; performing an arcsine function calculation on the intermediate calculated value to obtain a slope degree; and performing a tangent function calculation on the slope degree to obtain the slope value.

It should be noted that, for other implementation details and effects of the device for gradient calculating, reference may be made to the aforementioned embodiments of the method for gradient calculating, which will not be repeated herein.

An embodiment of the present application further provides a machine-readable storage medium, where instructions are stored on the machine-readable storage medium, and the instructions are used to cause a machine to execute the method for gradient calculating of the foregoing embodiments.

An embodiment of the present application further provides a processor, which is used for running a program, wherein when the program runs, and the method for gradient calculating of the above-mentioned embodiment is executed.

An embodiment of the present application further provides a computer program product, which, when executed on a vehicle-related component, is adapted to execute a program initialized with the steps of the method for gradient calculating of the above-mentioned embodiments.

As will be appreciated by those skilled in the art, the embodiments of the present application may be provided as a method, a system, or a computer program product. Accordingly, the present application may take the form of entirely hardware embodiments, entirely software embodiments, or embodiments combining software and hardware aspects. Furthermore, the present application may take the form of a computer program product embodied on one or more computer-usable storage media (including, but not limited to, disk storage, CD-ROM, optical storage, etc.) having computer-usable program code embodied therein.

The present application is described with reference to flowchart illustrations and/or block diagrams of methods, apparatus (systems), and computer program products according to embodiments of the present application. It will be understood that each flow and/or block in the flowchart illustrations and/or block diagrams, and combinations of flows and/or blocks in the flowchart illustrations and/or block diagrams, can be implemented by computer program instructions. These computer program instructions may be provided to the processor of a general purpose computer, special purpose computer, embedded processor or other programmable data processing device to produce a machine such that the instructions executed by the processor of the computer or other programmable data processing device produce Means for implementing the functions specified in one or more of the flowcharts and/or one or more blocks of the block diagrams. In addition, it should be understood that the positional relationship of each process and/or block in the flowchart and/or block diagram of the embodiments of the present application is schematic, and those skilled in the art can adjust the execution of the process or block according to actual needs order.

These computer program instructions may also be stored in a computer-readable memory capable of directing a computer or other programmable data processing apparatus to function in a particular manner, such that the instructions stored in the computer-readable memory result in an article of manufacture comprising instruction means, the instructions an apparatus implements the functions specified in a flow or flows of the flowcharts and/or a block or blocks of the block diagrams.

These computer program instructions can also be loaded on a computer or other programmable data processing device to cause a series of operational steps to be performed on the computer or other programmable device to produce a computer-implemented process such that The instructions provide steps for implementing the functions specified in the flow or blocks of the flowcharts and/or the block or blocks of the block diagrams.

In a typical configuration, a computing device includes one or more processors (CPUs), input/output interfaces, network interfaces, and memory.

Memory may include non-persistent memory in computer readable media, random access memory (RAM) and/or non-volatile memory and so on, for example, read only memory (ROM) or flash memory (flash RAM). Memory is an example of a computer-readable medium.

Computer-readable media includes permanent and non-permanent, removable and non-removable media, and storage of information may be implemented by any method or technology. Information may be computer readable instructions, data structures, modules of programs, or other data. Examples of computer storage media include, but are not limited to, phase-change random access memory (PRAM), static random access memory (SRAM), dynamic random access memory (DRAM), other types of random access memory (RAM), read only memory (ROM), electrically erasable programmable read only memory (EEPROM), flash memory or other memory technology, compact disc read only memory (CD-ROM), digital versatile disc (DVD) or other optical storage, magnetic tape cassettes, magnetic tape magnetic disk storage or other magnetic storage devices or any other non-transmission medium that can be used to store information that can be accessed by a computing device.

It should also be noted that the term "comprising" or any other variation thereof is intended to encompass non-exclusive inclusion such that a process, method, article or device including a list of elements includes not only those elements, but also those not explicitly listed, or other elements inherent to such a process, method, commodity or device. Without further limitation, an element qualified by the phrase "comprising a . . . " does not preclude the presence of additional identical elements in the process, method, article of manufacture or device that includes the element.

The above descriptions are only preferred embodiments of the present application, and are not intended to limit the present application. Any modification, equivalent replacement, improvement, etc. made within the spirit and principle of the present application shall be included within the scope of protection of the present application.

What is claimed is:

1. A method for gradient calculating, wherein the method is applied to a vehicle provided with a processor, and the method comprises:

acquiring, by an electronic stability program, current operating parameters of the vehicle, wherein the current operating parameters include a current longitudinal acceleration, a current lateral acceleration, a current vehicle acceleration, and a current vehicle speed, wherein the vehicle comprises a lateral acceleration sensor and a longitudinal acceleration sensor configured for respectively collecting the current longitudinal acceleration and the current lateral acceleration;

querying a first influence value table preconfigured to match a first influence value corresponding to the current lateral acceleration and the current vehicle speed according to the current lateral acceleration and the current vehicle speed;

querying a second influence value table preconfigured to match a second influence value corresponding to the current vehicle acceleration and the current vehicle speed according to the current vehicle acceleration and the current vehicle speed;

correcting, by the processor, the current longitudinal acceleration according to the first influence value and the second influence value; and determining, by the processor, the gradient value based on the corrected current longitudinal acceleration.

2. The method for gradient calculating according to claim 1, wherein the step of acquiring, by the electronic stability program, current operating parameters of the vehicle comprise:

performing, by a low-pass filter, filtering processing on the current longitudinal acceleration and the current lateral acceleration.

3. The method for gradient calculating according to claim 1, wherein the step of determining, by the processor, a first influence value of the current lateral acceleration on the current longitudinal acceleration according to the current lateral acceleration and the current vehicle speed comprises:
wherein the first influence value table being configured to show a corresponding relationship between a vehicle speed and a lateral acceleration of the vehicle and the first influence value.

4. The method for gradient calculating according to claim 3, wherein before querying a first influence value table preconfigured, the method for gradient calculating further comprises:
acquiring a plurality of lateral acceleration values correspondingly generated when the vehicle operates in a plurality of steering conditions under a same vehicle speed and a same accelerator pedal opening, wherein the plurality of steering conditions comprise a no-steering condition;
calculating a difference of each lateral acceleration value corresponding to the longitudinal acceleration value in the no-steering condition as the first influence value; and
configuring the first influence value table based on the calculated first influence value.

5. The method for gradient calculating according to claim 1, wherein the step of determining, by the processor, a second influence value of the current vehicle acceleration on the current longitudinal acceleration according to the current vehicle acceleration and the current vehicle speed comprises:
the second influence value table being configured to show corresponding relationship between a vehicle speed and a vehicle acceleration of the vehicle and the second influence value.

6. The method for gradient calculating according to claim 5, wherein before querying a second influence value table preconfigured, the method for gradient calculating further comprises:
acquiring a plurality of vehicle acceleration values and longitudinal acceleration values corresponding to multiple acceleration and deceleration conditions when the vehicle is running in a straight line;
calculating difference between each longitudinal acceleration value and the corresponding vehicle acceleration value as the second influence value; and
configuring the second influence value table based on the calculated second influence value.

7. The method for gradient calculating according to claim 1, wherein the step of correcting, by the processor, the current longitudinal acceleration according to the first influence value and the second influence value comprises:
subtracting the first influence value and the second influence value from the current longitudinal acceleration to acquire the corrected current longitudinal acceleration.

8. The method for gradient calculating according to claim 1, wherein the step of determining, by the processor, the gradient value based on the corrected current longitudinal acceleration comprises:
acquiring a difference between the corrected current longitudinal acceleration and the current vehicle acceleration, and dividing the difference by a gravitational acceleration to acquire an intermediate calculated value;

performing an arcsine function calculation on the intermediate calculated value to obtain a slope degree; and
performing a tangent function calculation on the slope degree to obtain the slope value.

9. A device for gradient calculating, wherein the device is applied to a vehicle provided with a processor, and the device comprises:
an operating parameter acquisition module, configured for acquiring, an electronic stability program, current operating parameters of the vehicle, wherein the current operating parameters include a current longitudinal acceleration, a current lateral acceleration, a current vehicle acceleration, and a current vehicle speed, wherein the vehicle comprises a lateral acceleration sensor and a longitudinal acceleration sensor configured for respectively collecting the current longitudinal acceleration and the current lateral acceleration;
a first influence value determination module, configured for querying a first influence value table preconfigured to match a first influence value corresponding to the current lateral acceleration and the current vehicle speed according to the current lateral acceleration and the current vehicle speed;
a second influence value determination module, configured for querying a second influence value table preconfigured to match a second influence value corresponding to the current vehicle acceleration and the current vehicle speed according to the current vehicle acceleration and the current vehicle speed;
a longitudinal acceleration correction module, configured for correcting, by the processor, the current longitudinal acceleration according to the first influence value and the second influence value; and
a gradient value determination module, configured for determining, by the processor, the gradient value based on the corrected current longitudinal acceleration.

10. The device for gradient calculating according to claim 9, wherein the operating parameter acquisition module comprises:
a processing sub-module, configured for performing, by a low-pass filter, filtering processing on the current longitudinal acceleration and the current lateral acceleration.

11. The device for gradient calculating according to claim 9, wherein the first influence value determination module comprises:
the first influence value table being configured to show a corresponding relationship between a vehicle speed and a lateral acceleration of the vehicle and the first influence value; and
a first table building sub-module, configured for acquiring a plurality of lateral acceleration values correspondingly generated when the vehicle operates in a plurality of steering conditions under a same vehicle speed and a same accelerator pedal opening, calculating a difference of each lateral acceleration value corresponding to the longitudinal acceleration value in the no-steering condition as the first influence value, and configuring the first influence value table based on the calculated first influence value.

12. The device for gradient calculating according to claim 9, wherein the second influence value determination module comprises:
the second influence value table being configured to show corresponding relationship between a vehicle speed and a vehicle acceleration of the vehicle and the second influence value; and a second table building sub-module, configured for acquiring a plurality of vehicle acceleration values and longitudinal acceleration values corresponding to multiple acceleration and deceleration conditions when the vehicle is running in a straight line, calculating difference between each longitudinal acceleration value and the corresponding vehicle acceleration value as the second influence value, and configuring the second influence value table based on the calculated second influence value.

13. The device for gradient calculating according to claim 9, wherein the longitudinal acceleration correction module, configured for correcting, by the processor, the current longitudinal acceleration according to the first influence value and the second influence value, and comprises:
subtracting the first influence value and the second influence value from the current longitudinal acceleration to acquire the corrected current longitudinal acceleration.

14. The device for gradient calculating according to claim 9, wherein the gradient value determination module, configured for determining, by the processor, the gradient value based on the corrected current longitudinal acceleration, and comprises:
acquiring a difference between the corrected current longitudinal acceleration and the current vehicle acceleration, and dividing the difference by a gravitational acceleration to acquire an intermediate calculated value;
performing an arcsine function calculation on the intermediate calculated value to obtain a slope degree; and
performing a tangent function calculation on the slope degree to obtain the slope value.

15. A machine-readable storage medium on which instructions are stored, wherein the instructions are configured for causing a method for gradient calculating-executed by a machine, wherein the machine is configured to execute:
acquiring, by an electronic stability program, current operating parameters of a vehicle, wherein the current operating parameters include a current longitudinal acceleration, a current lateral acceleration, a current vehicle acceleration, and a current vehicle speed, wherein the vehicle comprises a lateral acceleration sensor and a longitudinal acceleration sensor configured for respectively collecting the current longitudinal acceleration and the current lateral acceleration;
querying a first influence value table preconfigured to match a first influence value corresponding to the current lateral acceleration and the current vehicle speed according to the current lateral acceleration and the current vehicle speed;
querying a second influence value table preconfigured to match a second influence value corresponding to the current vehicle acceleration and the current vehicle speed according to the current vehicle acceleration and the current vehicle speed;

correcting, by the processor, the current longitudinal acceleration according to the first influence value and the second influence value; and
determining, by the processor, the gradient value based on the corrected current longitudinal acceleration.

16. The machine-readable storage medium according to claim 15, wherein in the step of acquiring, by the electronic stability program, current operating parameters of the vehicle comprise:
performing, by a low-pass filter, filtering processing on the current longitudinal acceleration and the current lateral acceleration.

17. The machine-readable storage medium according to claim 15, wherein in the step of determining, by the processor, a first influence value of the current lateral acceleration on the current longitudinal acceleration according to the current lateral acceleration and the current vehicle speed, the machine is configured to execute:
wherein the first influence value table is configured to show a corresponding relationship between a vehicle speed and a lateral acceleration of the vehicle and the first influence value.

18. The machine-readable storage medium according to claim 15, wherein in the step of determining, by the processor, a second influence value of the current vehicle acceleration on the current longitudinal acceleration according to the current vehicle acceleration and the current vehicle speed, the machine is configured to execute:
wherein the second influence value table is configured to show corresponding relationship between a vehicle speed and a vehicle acceleration of the vehicle and the second influence value.

19. The machine-readable storage medium according to claim 15, wherein in the step of correcting, by the processor, the current longitudinal acceleration according to the first influence value and the second influence value, the machine is configured to execute:
subtracting the first influence value and the second influence value from the current longitudinal acceleration to acquire the corrected current longitudinal acceleration.

20. The machine-readable storage medium according to claim 15, wherein in the step of determining, by the processor, the gradient value based on the corrected current longitudinal acceleration, the machine is configured to execute:
acquiring a difference between the corrected current longitudinal acceleration and the current vehicle acceleration, and dividing the difference by a gravitational acceleration to acquire an intermediate calculated value;
performing an arcsine function calculation on the intermediate calculated value to obtain a slope degree; and
performing a tangent function calculation on the slope degree to obtain the slope value.

* * * * *